US012593328B2

(12) United States Patent
Swartz et al.

(10) Patent No.: US 12,593,328 B2
(45) Date of Patent: Mar. 31, 2026

(54) MULTI-LINK OPERATION FOR PEER-TO-PEER WIFI COMMUNICATION

(71) Applicant: Cisco Technology, Inc., San Jose, CA (US)

(72) Inventors: John M. Swartz, Lithia, FL (US); Malcolm M. Smith, Richardson, TX (US); Pooya Monajemi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 359 days.

(21) Appl. No.: 18/301,400

(22) Filed: Apr. 17, 2023

(65) Prior Publication Data

US 2024/0163863 A1      May 16, 2024

Related U.S. Application Data

(60) Provisional application No. 63/383,447, filed on Nov. 11, 2022.

(51) Int. Cl.
*H04W 72/121*        (2023.01)
*H04W 76/15*         (2018.01)

(52) U.S. Cl.
CPC ......... *H04W 72/121* (2013.01); *H04W 76/15* (2018.02)

(58) Field of Classification Search
CPC .......................... H04W 72/121; H04W 76/15
See application file for complete search history.

(56) References Cited

U.S. PATENT DOCUMENTS

| | | | |
|---|---|---|---|
| 2021/0250963 A1* | 8/2021 | Seok ...................... | H04W 72/12 |
| 2022/0022087 A1 | 1/2022 | Chu et al. | |
| 2022/0078844 A1 | 3/2022 | Cherian et al. | |
| 2022/0116862 A1 | 4/2022 | Cariou | |
| 2023/0021113 A1 | 1/2023 | Shafin et al. | |
| 2023/0262807 A1* | 8/2023 | Jiang ...................... | H04W 76/15 |
| | | | 370/329 |
| 2024/0040645 A1* | 2/2024 | Shafin ................... | H04W 76/15 |
| 2024/0237069 A1* | 7/2024 | Abushattal ........ | H04W 74/0841 |

FOREIGN PATENT DOCUMENTS

| | | |
|---|---|---|
| CN | 112333768 A | 2/2021 |
| WO | 2022042268 A1 | 3/2022 |

* cited by examiner

*Primary Examiner* — Gbemileke J Onamuti
(74) *Attorney, Agent, or Firm* — Patterson + Sheridan, LLP

(57)      ABSTRACT

Techniques for wireless multi-link operation (MLO) are disclosed. These techniques include determining that a first wireless station (STA), in a wireless network comprising a wireless access point (AP) and a plurality of peer-to-peer (P2P) STAs, comprises a non-simultaneous transmit and receive (NSTR) constraint. The techniques further include allocating one or more wireless links relating to MLO for the AP and the plurality of P2P STAs, based on the NSTR constraint, and initiating transmission between the AP and one or more of the P2P STAs using MLO and the allocated one or more wireless links.

20 Claims, 6 Drawing Sheets

300

310

Start

402

Select link

404

Indicate link status

406

Allocate TWT to avoid simultaneous operation

408

Enforce non-negotiable all TID map

End

500

Start

502
Determine STA is NSTR

504
Generate end-time signal

506
Transmit end time signal

End

MULTI-LINK OPERATION FOR PEER-TO-PEER WIFI COMMUNICATION

CROSS-REFERENCE TO RELATED APPLICATIONS

This application claims benefit of U.S. provisional patent application Ser. No. 63/383,447 filed Nov. 11, 2022. The aforementioned related patent application is herein incorporated by reference in its entirety.

TECHNICAL FIELD

Embodiments presented in this disclosure generally relate to wireless communication. More specifically, embodiments disclosed herein relate to multi-link operation (MLO) for WiFi.

BACKGROUND

In peer-to-peer (P2P) WiFi implementations, the communicating peers (e.g., wireless stations (STAs)) need to communicate both with each other and, potentially, with a wireless access point (AP). When at least some of the communicating peers include multiple radios and support MLO, it would be desirable for those peers to simultaneously communicate with other peers and the AP. But current solutions do not support this feature, particularly where peers vary in support for operating in a simultaneous transmit and receive (STR) mode, as opposed to a non-simultaneous transmit and receive (NSTR) mode.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
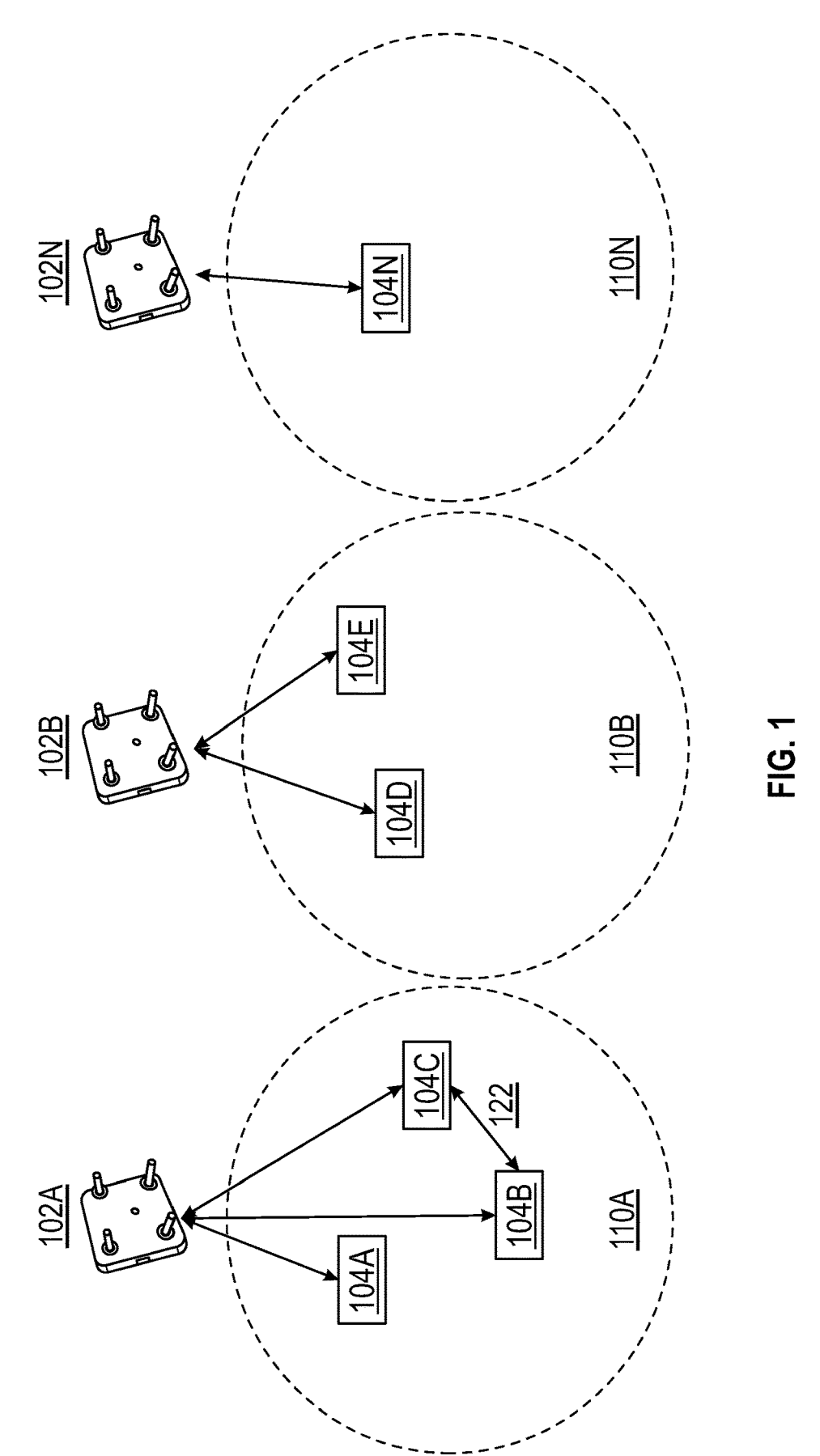
FIG. 1 illustrates a wireless networking environment with MLO for P2P communication, according to one embodiment.

Embodiments include a method. The method includes determining that a first wireless station (STA), in a wireless network comprising a wireless access point (AP) and a plurality of peer-to-peer (P2P) STAs, includes a non-simultaneous transmit and receive (NSTR) constraint. The method further includes allocating one or more wireless links relating to multi-link operation (MLO) for the AP and the plurality of P2P STAs, based on the NSTR constraint. The method further includes initiating transmission between the AP and one or more of the P2P STAs using MLO and the allocated one or more wireless links.

Embodiments further include system, including a processor and a memory having instructions stored thereon which, when executed on the processor, performs operations. The operations include determining that a first STA, in a wireless network comprising an AP and a plurality of P2P STAs, includes an NSTR constraint. The operations further include allocating one or more wireless links relating to MLO for the AP and the plurality of P2P STAs, based on the NSTR constraint. The operations further include initiating transmission between the AP and one or more of the P2P STAs using MLO and the allocated one or more wireless links.

Embodiments further include a non-transitory computer-readable medium having instructions stored thereon which, when executed by a processor, performs operations. The operations include determining that a first STA, in a wireless network comprising an AP and a plurality of P2P STAs, includes an NSTR constraint. The operations further include allocating one or more wireless links relating to MLO for the AP and the plurality of P2P STAs, based on the NSTR constraint. The operations further include initiating transmission between the AP and one or more of the P2P STAs using MLO and the allocated one or more wireless links.

Example Embodiments

In an embodiment, MLO promotes the use of multiple wireless interfaces to allow concurrent data transmission and reception in APs and STAs (e.g., with dual- or tri-band capabilities). MLO can support multiple transmission modes, including STR and NSTR. In an embodiment, STR allows for concurrent uplink and downlink communication, while an NSTR constraint (e.g., a device operating in NSTR mode) limits devices to either uplink or downlink communication, at one time.

A primary challenge for MLO P2P communication is establishing which MLO mode to operate in given the desire for simultaneous (or quasi simultaneous) communication between peers and an AP. For example, assume an AP can support all modes (e.g., STR and NSTR). The problem then is to decide which MLO mode (e.g., STR or NSTR) a given STA should choose. Ideally, a solution should allow MLO operation between a non-AP STA and a P2P STA, while also allowing at least some simultaneous communication between the AP and the non-AP STA.

Further, operation with devices that support a mix of STR and NSTR modes is challenging. As described below, when an AP and all STAs support STR, MLO can be implemented for both the P2P and AP communication without any additional MLD consideration. But where one or more of the STAs operate with an NSTR constraint, a lack of coordination and signaling between devices can lead to missed control frames (e.g. beacons), retries and timeouts, and other issues. One or more techniques described herein address these problems by improving coordination and signaling between devices (e.g., an AP and P2P STAs) to allow for appropriate simultaneous transmission while still taking into account NSTR constraints. For example, as discussed below in relation to FIGS. 3 and 4, a STA in a deployment with an AP and at least one NSTR STA can report link status, allocate target wake time (TWT), and enforce traffic identifier (TID) mapping to ensure correct MLO operation for both the AP communication and P2P communication among STAs. Further, as discussed below in relation to FIG. 5, the STA can provide end-time signaling, as necessary, to ensure physical layer protocol data units (PPDUs) can be properly acknowledged by NSTR devices.

FIG. 1 illustrates a wireless networking environment 100 with MLO for P2P communication, according to one embodiment. In an embodiment, the environment 100 includes a number of APs 102A-N. Each of the APs is associated with one or more STAs 104A-N. For example, the AP 102A is associated with three STAs 104A-C as part of a basic service set (BSS) 110A. The AP 102B is associated with two STAs 104D-E as part of a BSS 110B. The AP 102N is associated with an STA 104N as part of a BSS 110N. This is merely an example, and the environment 100 can include any suitable number and configuration of wireless devices. Further, each of the STAs 104A-N can be any suitable wireless device, including a laptop computer, a desktop computer, a smartphone, a tablet, an internet of things (IoT) device, a vehicle, another suitable user device, or a wireless network infrastructure device (e.g., a wireless access point (AP)).

In an embodiment, the STA 104B has a P2P link 122 with the STA 104C. Further, both the STA 104B and the STA 104C are associated with the AP 102A and can communicate with the AP 102A. Assume the AP 102A can support both STR and NSTR modes, for MLO. If both the STA 104B and the STA 104C support STR, then MLO can be implemented for both the P2P and AP communication without any additional MLD consideration. The STAs 104B and 104C can transmit data (e.g., transact media access control (MAC) protocol data units (MPDUs)) between each other and the AP 102A using any available MLD link, without any link constraints. For example, the AP 102A and the STAs 104B and 104C are STR, and thus know, using existing techniques, when each MLD link is busy and should not be used to transmit data.

For a mix of STA and NSTR devices, however, MLO is more complex. For example, assume one of the STAs 104B and 104C is STR and the other is NSTR. The STR device can generally act in the BSS mode and achieve simultaneity with the AP MLD and P2P MLD. However, the NSTR STA must ensure that PPDUs on both links (e.g., to the AP and the other STA) end at the same time. As discussed further, below, with regard to FIG. 5, this allows for accurate acknowledgement messages for both the STR and NSTR STAs.

Further, there is an underlying issue of link availability. That is, when the non-AP STA (e.g., the STA 104B) is in simultaneous communications with its AP (e.g., the AP 102A) and its P2P STA (e.g., the STA 104C) the other node (e.g., the STA 104C) is unaware of link unavailability or NSTR constraints. This can lead to missed control frames (e.g. beacons), retries and timeouts, and other issues.

One or more of these issues can be addressed through improvements to allow a non-AP STA to act, in some ways, as an AP. For example, the non-AP STA (e.g., the STA 104B) can report link status to the P2P STA (e.g., the STA 104C) in a manner similar to existing techniques used with power savings, can affect the next TWT allocation to avoid simultaneous operation, and can express a non-negotiable all TID to link mapping to ensure traffic is transmitted over the appropriate link. This is discussed below, with regard to FIGS. 3-4. Further, these are merely example and any suitable techniques and combinations of techniques can be used.

Before continuing with further discussion, it is useful to delineate the operation of a device with multiple links (e.g., MLO) in the generic sense from that specifically of the Multi-Link-Device (MLD) defined in various WiFi standards (e.g., WiFi 7 and 802.11be). In existing WiFi standards, all links of an MLD terminate and originate from the same MAC layer entity identified by a virtual MLD address. Further, MPDU processing (e.g. acknowledgment (ACK) generation and score boarding) is the same entity for all links in the MLD (e.g., at a non-AP STA or an AP).

For one or more techniques described herein, this requirement has been modified and instead the individual links of an STA can terminate on different MAC entities. One MAC entity could be the P2P peer of a non-AP STA, and one could be an AP having no MAC layer relationship. However, one or more techniques described herein can make use of existing WiFi 7 MLD techniques, including the class of device (e.g., STR, NSTR, multi-link single-radio (MLSR)) and existing simultaneous operation behavior and channel separation requirements.

Figure 2:
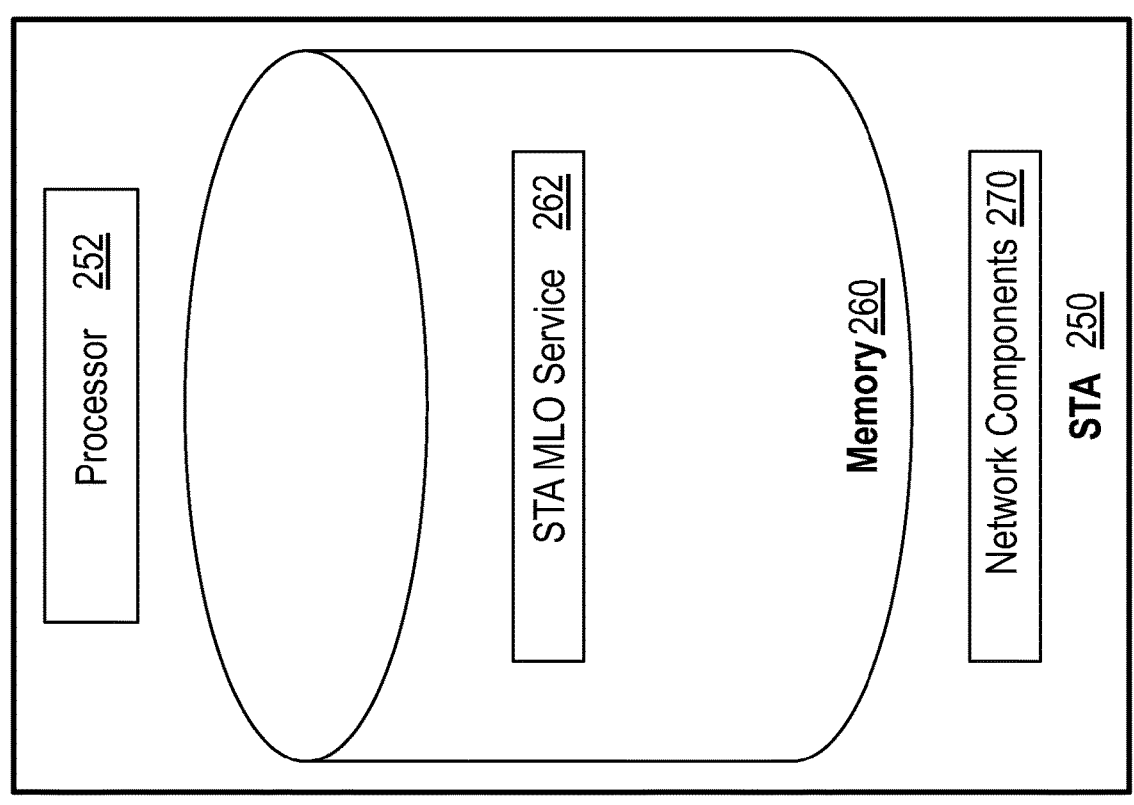
FIG. 2 illustrates block diagrams for an AP and an STA, according to one embodiment.
Figure 2:
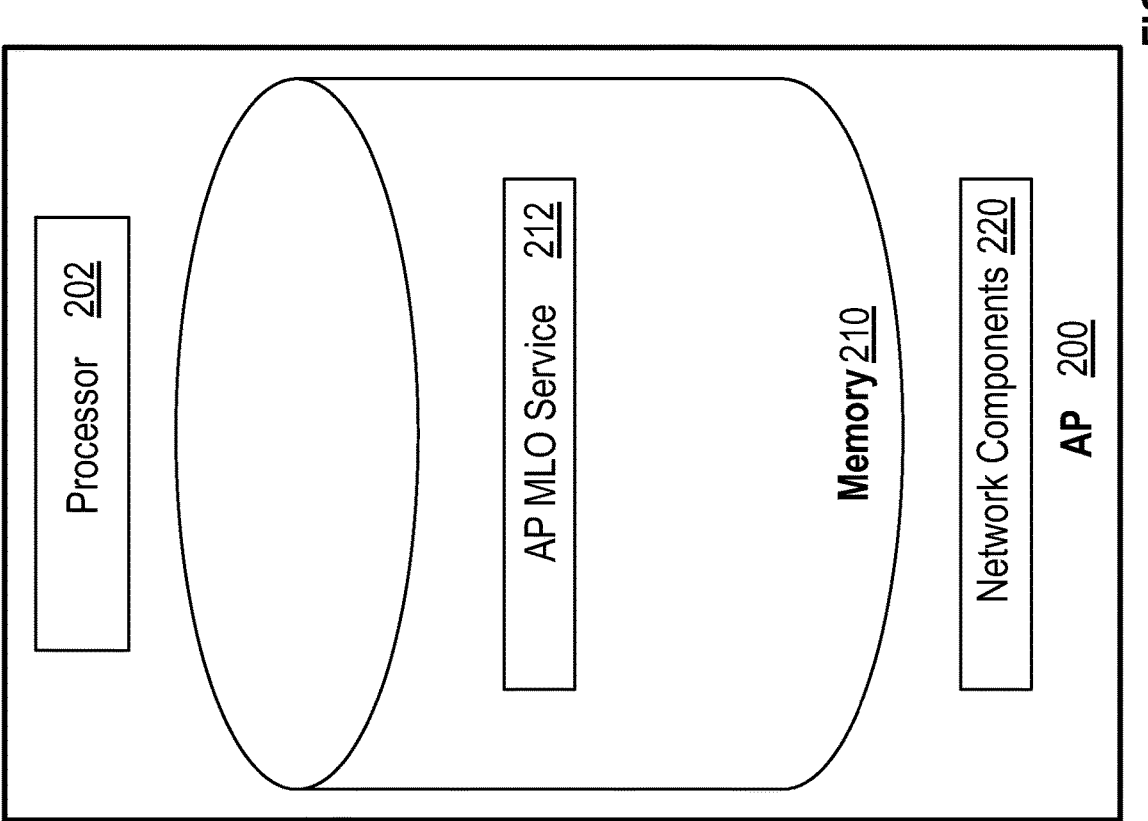

FIG. 2 illustrates block diagrams for an AP 200 and an STA 250, according to one embodiment. In an embodiment, the AP 200 can correspond with any of the APs 102A-N illustrated in FIG. 1, and the STA 250 can correspond with any of the STAs 104A-N illustrated in FIG. 1.

The AP 200 includes a processor 202, a memory 210, and network components 220. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 220 include the components necessary for the AP to interface with a communication network, as discussed above in relation to FIG. 1. For example, the network components 220 can include wired, WiFi, or cellular network interface components and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory.

The memory 210 generally includes program code for performing various functions related to use of the AP 200. The program code is generally described as various functional "applications" or "modules" within the memory 210, although alternate implementations may have different functions and/or combinations of functions. Within the memory 210, the AP MLO service 212 facilitates MLO for P2P communication. This is discussed further, below, with regard to FIGS. 3-4. Further, using an AP 200 for coordinating MLO for P2P communication is merely one example. Alternatively, or in addition, any other network device (e.g., a wireless local area network (WLAN) controller (WLC) or another network component) can be used.

The STA 250 includes a processor 252, a memory 260, and network components 270. The processor 252 generally retrieves and executes programming instructions stored in the memory 260. The processor 252 is representative of a single CPU, multiple CPUs, a single CPU having multiple processing cores, graphics processing units (GPUs) having multiple execution paths, and the like.

The network components 270 include the components necessary for the STA 250 to interface with a communication network, as discussed above in relation to FIG. 1. For example, the network components 270 can include wired, WiFi, or cellular network interface components and associated software. Although the memory 260 is shown as a single entity, the memory 260 may include one or more memory devices having blocks of memory associated with physical addresses, such as random access memory (RAM), read only memory (ROM), flash memory, or other types of volatile and/or non-volatile memory.

The memory 260 generally includes program code for performing various functions related to use of the STA 250. The program code is generally described as various functional "applications" or "modules" within the memory 260, although alternate implementations may have different functions and/or combinations of functions. Within the memory 260, the STA MLO service 262 facilitates MLO for P2P communication. This is discussed further, below, with regard to FIGS. 3-4. Further, using an STA 250 for MLO for P2P communication is merely one example. Alternatively, or in addition, any other network device (e.g., the AP 200, a WLC or another network component, or any suitable combination) can be used.

Figure 3:
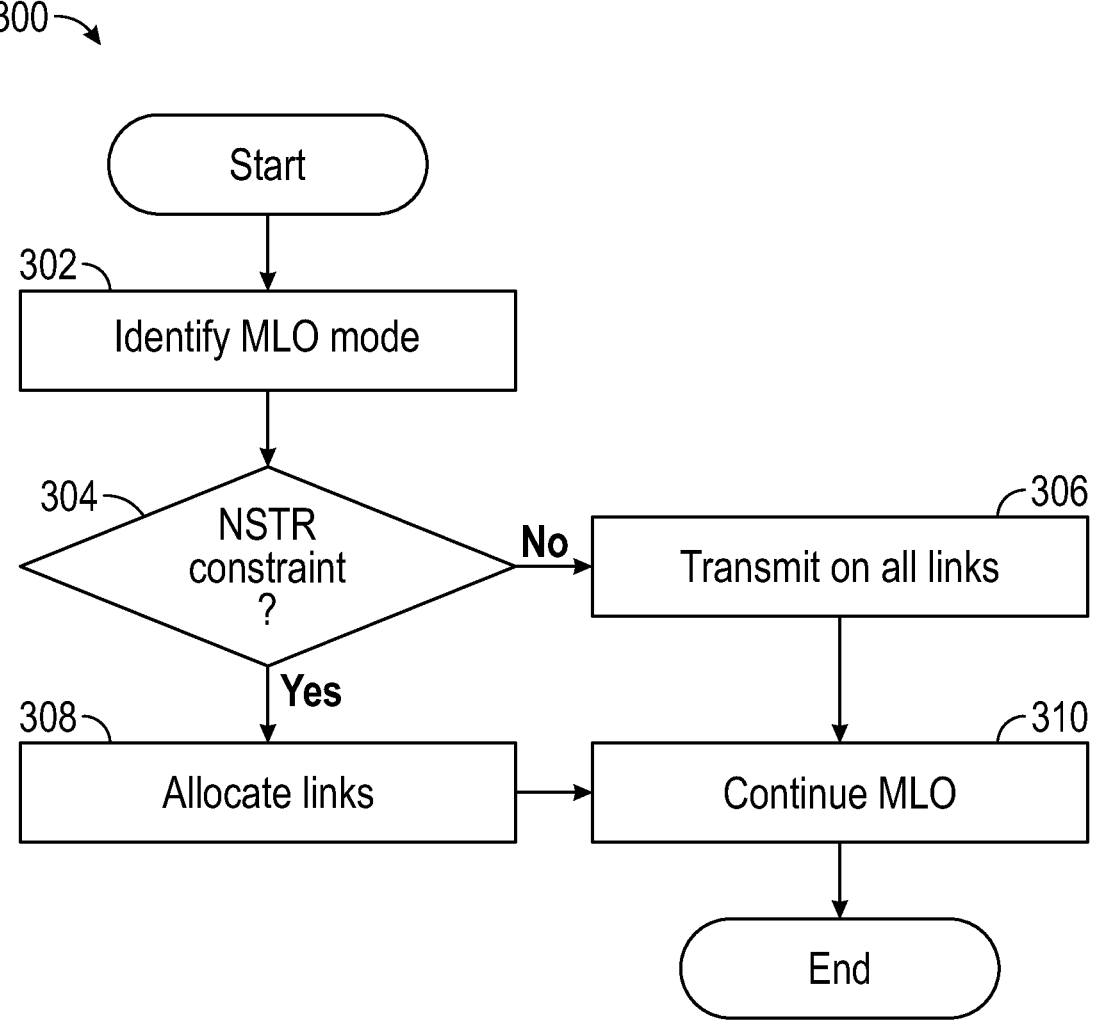
FIG. 3 is a flowchart illustrating MLO for P2P WiFi communication, according to one embodiment.

FIG. 3 is a flowchart 300 illustrating MLO for P2P WiFi communication, according to one embodiment. At block 302 an MLO service identifies the MLO mode for a wireless device (e.g., STR or NSTR). In an embodiment, an STA can facilitate simultaneous communication with an AP and another STA (e.g., as a P2P connection).

Using FIG. 1 as an example, assume that the STAs 104B and 104C are both connected to the AP 102A and to each other through a P2P link 122. The STA 104B is not, itself, an AP but it can act as an AP in certain respects to facilitate MLO with the AP 102A and the P2P STA 104C. An STA MLO service (e.g., the STA MLO service 262 illustrated in FIG. 2) can operate on the STA 104B and can identify the MLO mode (e.g., STR or NSTR) for the STA 104B. Further, the STA MLO service can identify the MLO mode for the P2P STA 104C.

At block 304, the MLO service (e.g., the STA MLO service, an AP MLO service, or an MLO service operating on a controller or any other suitable entity) determines whether an NSTR constraint is present. For example, the MLO service can determine whether any P2P STAs have an NSTR constraint. Using FIG. 1 as an example, the STA 104B can determine whether either of the STAs 104B or 104C have an NSTR constraint.

If an NSTR constraint is present, the flow proceeds to block 306. At block 306, an AP MLO service (e.g., the AP MLO service 212 illustrated in FIG. 2) and the STA MLO service transmit on all links. In an embodiment, because no NSTR constraint is present (e.g., all devices operate in STR), no additional MLD consideration is necessary and all links can be used.

Returning to block 304, if an NSTR constraint is present (e.g., one of the P2P STAs has an NSTR constraint), the flow proceeds to block 308. At block 308, the MLO service (e.g., the STA MLO service) allocates links. For example, the MLO service can report its link status to the P2P STA(s), affect the next TWT allocation to reflect unavailability of the AP link, and enforce a non-negotiable all TID to link map. This is discussed further, below, with regard to FIG. 4.

At block 310, the MLO service continues MLO. For example, the MLO service can continue MLO with all links allocated, if all P2P devices are STR. As another example, the MLO service can continue MLO with the links allocated at block 308, if one or more of the P2P devices have an NSTR constraint.

Figure 4:
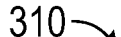
FIG. 4 is a flowchart illustrating allocating links for MLO for P2P WiFi communication, according to one embodiment.
Figure 4:
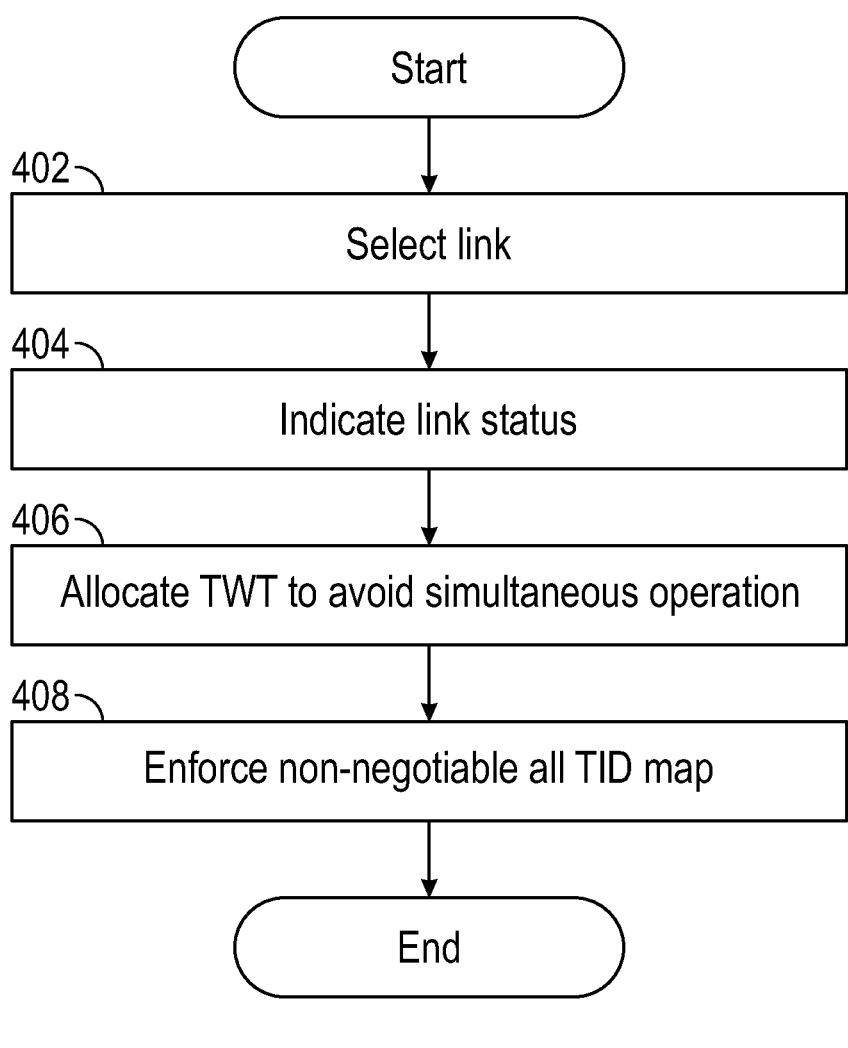

FIG. 4 is a flowchart illustrating allocating links for MLO for P2P WiFi communication, according to one embodiment. In an embodiment, FIG. 4 corresponds with block 308 illustrated in FIG. 3. At block 402 an MLO service identifies the MLO mode for a wireless device (e.g., STR or NSTR). In an embodiment, an STA can facilitate simultaneous communication with an AP and another STA (e.g., as a P2P connection).

Again using FIG. 1 as an example, assume that the STAs 104B and 104C are both connected to the AP 102A and to each other through a P2P link 122. The STA 104B is not, itself, an AP but it can act as an AP in certain respects to facilitate MLO with the AP 102A and the P2P STA 104C. Further, assume either the STA 104B or the STA 104C operates with an NSTR constraint. An STA MLO service (e.g., the STA MLO service 262 illustrated in FIG. 2) can operate on the STA 104B and can select a link, among multiple available links, for AP transmission and P2P transmission.

At block 404 the MLO service indicates link status. For example, assume the STA 104B illustrated in FIG. 1 is acting as the quasi-AP STA for the P2P STA 104C. An STA MLO service operating on the STA 104B can indicate to the P2P STA 104C the link status. This can be done, for example, by identifying an unavailable link using a temporary out-of-service indication, similar to existing messaging used for power savings.

At block 406, the MLO service allocates TWT to avoid simultaneous operation. In an embodiment, where all STAs operate in STR mode without an NSTR constraint, MLO can allow for simultaneous transmission by an STA (e.g., the STA 104B illustrated in FIG. 1) to both an AP (e.g., the AP 102A illustrated in FIG. 1) and another STA (e.g., the STA 104C illustrated in FIG. 1). But as noted above, assume at least one of the STAs operates with an NSTR constraint. The MLO service allocates TWT to reflect the unavailability of one or more links (e.g., an AP link) and avoid simultaneous operation (e.g., because of the NSTR constraint).

At block 408, the MLO service enforces a non-negotiable all TID map. In an embodiment, use of TIDs typically allows for particular traffic (e.g., particular traffic types) to be allocated to particular links in a wireless deployment. But as noted above, the MLO service marks some links as unavailable because of NSTR constraints for one or more of the STAs. In an embodiment, the MLO service effectively overrides any TID link mapping so that traffic is allocated to available links and not allocated to unavailable links (e.g., as indicated at block 402, above).

Figure 5:
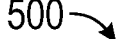
FIG. 5 is a flowchart illustrating end time signaling for MLO for P2P WiFi communication, according to one embodiment.
Figure 5:
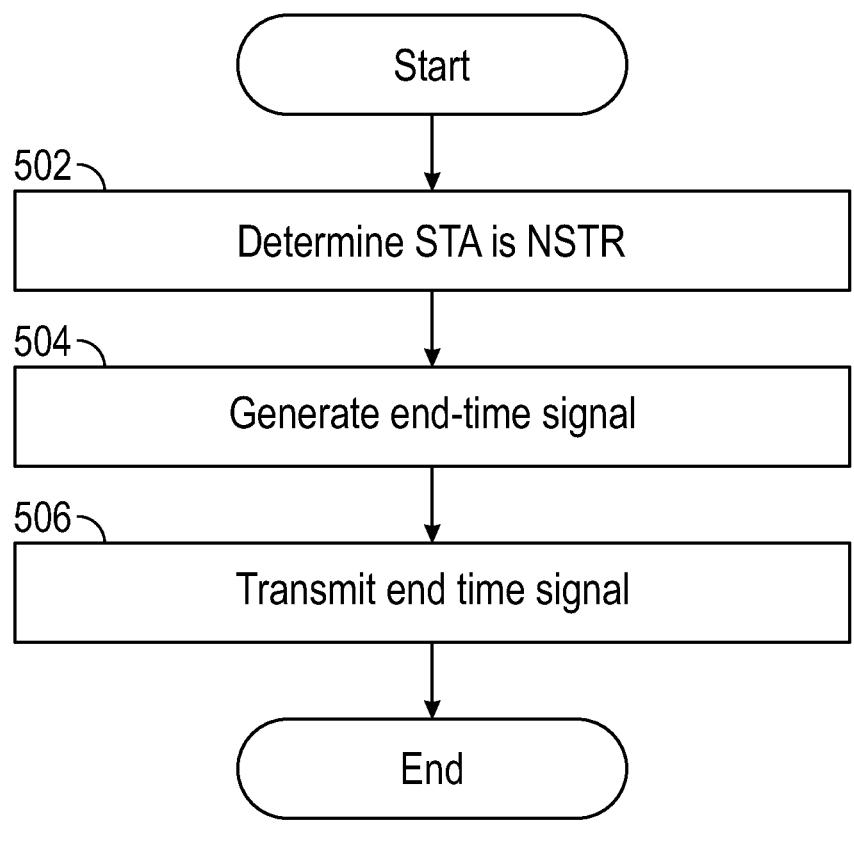

FIG. 5 is a flowchart 500 illustrating end time signaling for MLO for P2P WiFi communication, according to one embodiment. Returning to FIG. 1, assume that the STA 104B acts as a quasi-AP and communicates both with the AP 102A and the P2P STA 104C. If the STA 104B is NSTR, then to exploit simultaneity between the AP 102A and P2P STA 104C, the PPDUs received at the STA 104B must end at the same time. This is because the STA 104B is NSTR, and must be able to transmit appropriate acknowledgment messages to both, unassociated, nodes (e.g., to both the AP 102A and the P2P STA 104C). If either the AP 102A or the P2P STA 104C is still transmitting when a PPDU from the other ends, the NSTR STA 104B will not be able to send an appropriate acknowledgment.

In an embodiment, this can be improved by transmitting an end time signal from the STA 104B to the AP 102A and the P2P STA 104C. At block 502, an MLO service (e.g., the STA MLO service 262 illustrated in FIG. 2) determines that the STA is NSTR. For example, an STA MLO service operating on the STA 104B can determine that the STA 104B is NSTR. This is merely an example, and any suitable device and service can determine that the STA is NSTR.

At block 504, the MLO service generates an end-time signal. For example, the MLO service can generate a "Next PPDU End-time preference" signal to be sent to both the associated AP (e.g., the AP 102A) and the P2P STA (e.g., the STA 104C). In an embodiment, this signal can be piggy-backed to an existing ACK or block acknowledgement (BA) message, or another MPDU, because it will be a short information element (IE) in the message. This is merely an example, and the end-time signal can be any suitable network message or can be combined with any suitable network message.

At block 506, the MLO service transmits the end time signal. For example, the STA 104B can transmit the end time signal to both an AP (e.g., the STA 102A) and a P2P STA (e.g., the STA 104C). In an embodiment, each node that receives the end time signal ensures the either a next PPDU sent to the STA 104B ends at the signaled time, or that no PPDU is sent.

Figure 6:
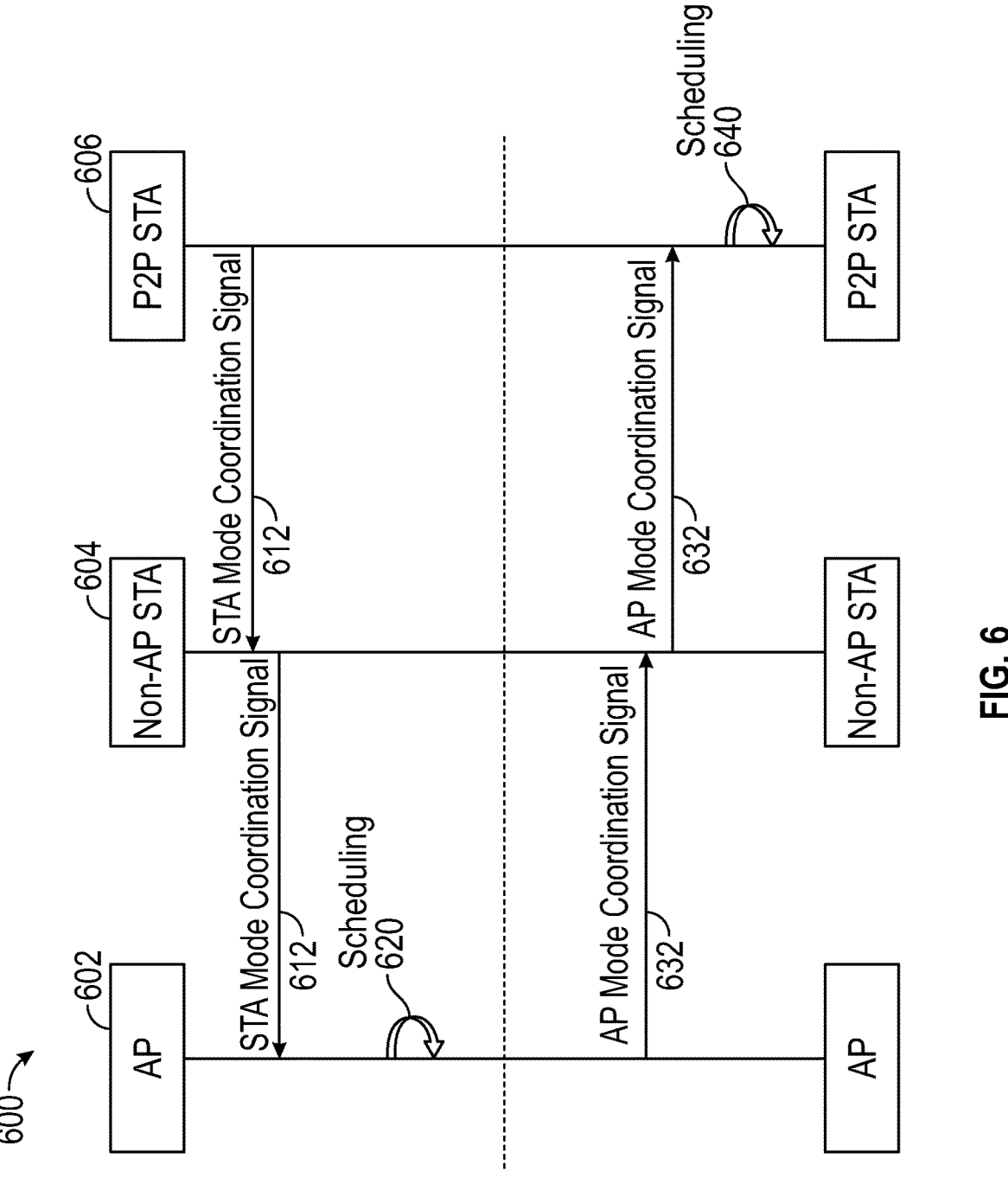
FIG. 6 is a message diagram illustrating STA and AP orchestration for MLO for P2P WiFi communication, according to one embodiment.

FIG. 6 is a message diagram 600 illustrating STA and AP orchestration for MLO for P2P WiFi communication, according to one embodiment. In an embodiment an AP 602 (e.g., the AP 102A illustrated in FIG. 1) is associated with multiple STAs 604 and 606 (e.g., the STAs 104B and 104C illustrated in FIG. 1), and the STAs have a P2P connection (e.g., the P2P connection 122 illustrated in FIG. 1). As discussed above in relation to FIGS. 3-5, the non-AP STA 604 is not, itself, an AP but it can act as an AP in certain respects to facilitate MLO with the AP 602 and the P2P STA 606.

In an embodiment, the non-AP STA 604 can assist with mode coordination for the P2P STA 606 and the AP 602. For example, the non-AP STA 604 can orchestrate communication between the P2P STA 606 and the AP 602 by forwarding mode coordination signals. Assume the P2P STA 606 needs to transmit a mode coordination signal to the AP 602 (e.g., a "Next PPDU End-time preference" signal as discussed above in relation to FIG. 5). As illustrated, the P2P STA 606 can use the non-AP STA 604 to forward the mode coordination signal to the AP 602. The P2P STA 606 transmits an STA mode coordination signal 612 to the non-AP STA 604. The non-AP STA 604 forwards the STA mode coordination signal 612 to the AP 602, and the AP undertakes appropriate scheduling 620 (e.g., end of PPDU matching).

As another example, the AP 602 can transmit an AP mode coordination signal 632 to the P2P STA 606 using the non-AP STA 604. The AP 602 transmits the AP mode coordination signal 632 to the non-AP STA 604, the non-AP STA 604 forwards the AP mode coordination signal 632 to the P2P STA 606, and the P2P STA 606 performs the appropriate scheduling 640. These are merely examples, and any number and configuration of STAs can be used. Further, a PPDU end signal is merely one example of a mode coordination signal, and any suitable signal can be used.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
determining that a first wireless station (STA), in a wireless network comprising a wireless access point (AP) and a peer-to-peer (P2P) STA, is subject to a non-simultaneous transmit and receive (NSTR) constraint;
allocating a wireless link relating to multi-link operation (MLO) for the AP and the P2P STA based on the NSTR constraint;
allocating the wireless link for communication between the first wireless STA and the P2P STA based on the NSTR constraint;
initiating transmission between the AP and the P2P STA using MLO and the allocated the wireless link; and
initiating communication between the STA and the P2P STA using the wireless link when the wireless link is not used for communication between the AP and the P2P STA.

2. The method of claim 1, wherein allocating the wireless link relating to MLO for the AP and the P2P STA, based on the NSTR constraint, comprises:
reporting an unavailable wireless link relating to the first wireless STA and the transmission using MLO.

3. The method of claim 2, wherein allocating the wireless link relating to MLO for the AP and the P2P STA, based on the NSTR constraint, comprises:
enforcing transmission of traffic associated with a plurality of traffic identifiers (TIDs) across available links in the wireless network, based on the reported unavailable wireless link.

4. The method of claim 3, wherein allocating the wireless link relating to MLO for the AP and the P2P STA, based on the NSTR constraint, comprises:
allocating a target wake time (TWT) to avoid simultaneous operation for the first wireless STA, the AP, and another of a plurality of P2P STAs.

5. The method of claim 1, wherein allocating the wireless link relating to MLO for the AP and the P2P STA, based on the NSTR constraint, comprises:
reporting an unavailable wireless link relating to the first STA and the transmission using MLO; and
allocating a target wake time (TWT) to avoid simultaneous operation for the first wireless STA, the AP, and another of a plurality of P2P STAs.

6. The method of claim 1, further comprising:
determining that the first wireless STA is in communication with the AP and with a second P2P STA; and
coordinating a simultaneous end to transmission of physical layer protocol data units (PPDUs) from the AP to the first wireless STA and from the second P2P STA to the first wireless STA.

7. The method of claim 6, wherein coordinating a simultaneous end to transmission of PPDUs from the AP to the first wireless STA and from the second P2P STA to the first wireless STA, comprises:
transmitting an end time signal to the AP and the second P2P STA.

8. The method of claim 7, wherein the end time signal comprises an information element (IE) in an acknowledgment message.

9. A system, comprising:
a processor; and
a memory having instructions stored thereon which, when executed on the processor, performs operations comprising:
determining that a first wireless station (STA), in a wireless network comprising a wireless access point (AP) and a peer-to-peer (P2P) STA, is subject to a non-simultaneous transmit and receive (NSTR) constraint;
allocating a wireless link relating to multi-link operation (MLO) for the AP and the P2P STA, based on the NSTR constraint;
allocating the wireless link for communication between the first wireless STA and the P2P STA based on the NSTR constraint;
initiating transmission between the AP and the P2P STA using MLO and the allocated wireless link; and
initiating communication between the STA and the P2P STA using the wireless link when the wireless link is not used for communication between the AP and the P2P STA.

10. The system of claim 9, wherein allocating the wireless link relating to MLO for the AP and the P2P STA, based on the NSTR constraint, comprises:
reporting an unavailable wireless link relating to the first wireless STA and the transmission using MLO.

11. The system of claim 10, wherein allocating the wireless link relating to MLO for the AP and the P2P STA, based on the NSTR constraint, comprises:

enforcing transmission of traffic associated with a plurality of traffic identifiers (TIDs) across available links in the wireless network, based on the reported unavailable wireless link.

12. The system of claim 11, wherein allocating the wireless link relating to MLO for the AP and the P2P STA, based on the NSTR constraint, comprises:

allocating a target wake time (TWT) to avoid simultaneous operation for the first wireless STA, the AP, and another of a plurality of P2P STAs.

13. The system of claim 9, wherein allocating the wireless link relating to MLO for the AP and the P2P STA, based on the NSTR constraint, comprises:

reporting an unavailable wireless link relating to the first wireless STA and the transmission using MLO; and allocating a target wake time (TWT) to avoid simultaneous operation for the first wireless STA, the AP, and another of a plurality of P2P STAs.

14. The system of claim 9, further comprising:

determining that the first wireless STA is in communication with the AP and with a second P2P STA; and coordinating a simultaneous end to transmission of physical layer protocol data units (PPDUs) from the AP to the first wireless STA and from the second P2P STA to the first wireless STA.

15. A non-transitory computer-readable medium having instructions stored thereon which, when executed by a processor, performs operations comprising:

determining that a first wireless station (STA), in a wireless network comprising a wireless access point (AP) and a peer-to-peer (P2P) STA, is subject to a non-simultaneous transmit and receive (NSTR) constraint;

allocating a wireless link relating to multi-link operation (MLO) for the AP and the P2P STA, based on the NSTR constraint;

allocating the wireless link for communication between the first wireless STA and the P2P STA based on the NSTR constraint;

initiating transmission between the AP and the P2P STA using MLO and the allocated wireless link; and initiating communication between the STA and the P2P STA using the wireless link when the wireless link is not used for communication between the AP and the P2P STA.

16. The non-transitory computer-readable medium of claim 15, wherein allocating the wireless link relating to MLO for the AP and the P2P STA, based on the NSTR constraint, comprises:

reporting an unavailable wireless link relating to the first wireless STA and the transmission using MLO.

17. The non-transitory computer-readable medium of claim 16, wherein allocating the wireless link relating to MLO for the AP and the P2P STA, based on the NSTR constraint, comprises:

enforcing transmission of traffic associated with a plurality of traffic identifiers (TIDs) across available links in the wireless network, based on the reported unavailable wireless link.

18. The non-transitory computer-readable medium of claim 17, wherein allocating the wireless link relating to MLO for the AP and the P2P STA, based on the NSTR constraint, comprises:

allocating a target wake time (TWT) to avoid simultaneous operation for the first wireless STA, the AP, and another of a plurality of P2P STAs.

19. The non-transitory computer-readable medium of claim 15, wherein allocating the wireless link relating to MLO for the AP and the P2P STA, based on the NSTR constraint, comprises:

reporting an unavailable wireless link relating to the first wireless STA and the transmission using MLO; and allocating a target wake time (TWT) to avoid simultaneous operation for the first wireless STA, the AP, and another of a plurality of P2P STAs.

20. The non-transitory computer-readable medium of claim 15, further comprising:

determining that the first wireless STA is in communication with the AP and with a second P2P STA; and coordinating a simultaneous end to transmission of physical layer protocol data units (PPDUs) from the AP to the first wireless STA and from the second P2P STA to the first wireless STA.

* * * * *